United States Patent [19]

Hysaw

[11] 3,733,734
[45] May 22, 1973

[54] QUICK-CHANGE SLIP-FLOAT
[76] Inventor: Jimmie H. Hysaw, 302 Summit Avenue, Lawton, Okla. 73501
[22] Filed: Oct. 1, 1971
[21] Appl. No.: 185,773

[52] U.S. Cl..................................43/44.9, 43/57.5 R
[51] Int. Cl................................................A01k 93/00
[58] Field of Search...........................43/44.9, 57.5 R

[56] References Cited
UNITED STATES PATENTS

| 786,597 | 4/1905 | Picken | 43/44.9 X |
| 2,729,015 | 1/1956 | Finnegan | 43/44.9 |
| 2,651,132 | 9/1953 | Lennen | 43/44.9 UX |
| 2,514,110 | 7/1950 | Warren | 43/57.5 R |
| 2,483,788 | 10/1949 | Smith | 43/44.9 |

FOREIGN PATENTS OR APPLICATIONS

| 11160/33 | 2/1934 | Australia | 43/44.9 |

Primary Examiner—Hugh R. Chamblee
Assistant Examiner—Daniel J. Leach
Attorney—Donald M. Wight et al.

[57] ABSTRACT

A quick-change slip-float and particularly a novel connector for quickly attaching and detaching fishing elements (floats, bobbers, sinkers, etc.) to a fishing line while precluding fouling and/or snagging of the line when in use. The connector includes one or more generally tubular sleeves slit from end to end along their entire length, a plug having a longitudinally extending bore defined by an internal unbroken peripheral surface, and means for removably fastening each plug in internal telescopic relationship to an associated sleeve. The bores are adapted to guide a fishing line centrally of the sleeve spaced away from the slit thereof to prevent fish line fouling and/or snagging when the sleeves are positioned telescopically internally of opposite ends of slit and bored floats, bobbers, etc.

10 Claims, 8 Drawing Figures

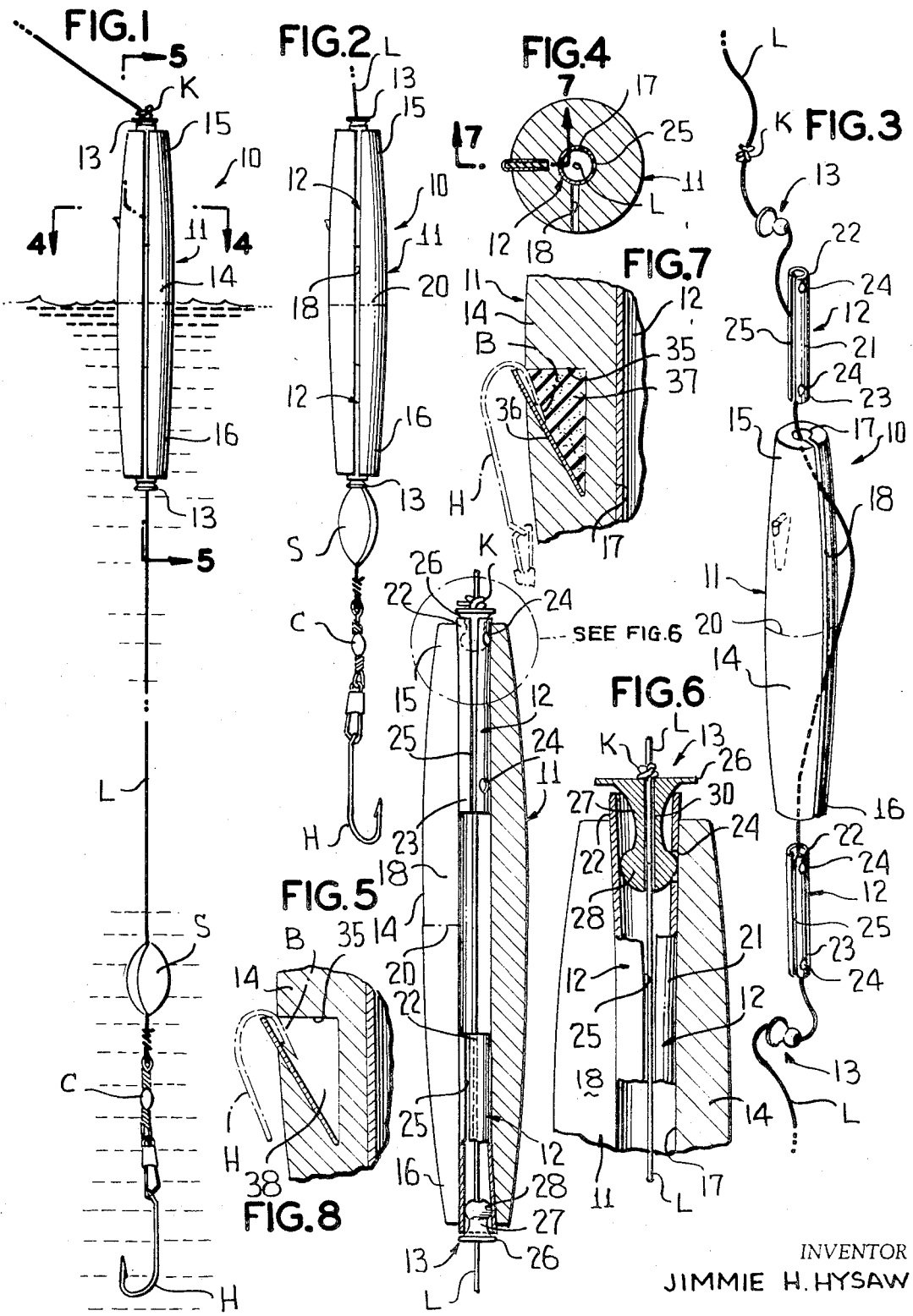

QUICK-CHANGE SLIP-FLOAT

One manner of fresh water fishing is simply to attach a hook, sinker and float or bobber to a fishing line which is in turn cast after being baited to a particular area. With this type of fishing, the bobber is generally slit longitudinally to receive the fishing line and is fixed thereto simply by jamming a match stick or like long narrow piece of material into the bobber to jam the line against the inner surface of the bobber. As can be appreciated, one major disadvantage of this type of arrangement is the difficulty in casting when the bobber is set for relatively large depths (10 feet and upwards) since on the back cast the hook, sinker and/or bobber would lie in the water. The drag so produced not only lessens casting distances but the accuracy thereof.

Faced with such disadvantages so-called "slip" float fishing has evolved and as indicated by its name the essential feature is the connection of the float to the fishing line by a slip connection which might be, for example, simply an axial bore in the float body through which the fishing line is passed prior to having the hook and sinker attached thereto. The line is then drawn to a desired depth, knotted between the float and the fishing pole, and rewound upon the fishing reel. Since the bobber is free to slip, it will assume a position closely adjacent the fishing hook and more often than not will be limited in its movement toward the fishing hook by butting against the sinker. However, as can be appreciated when the line is wound in prior to casting, there is but a minor length (approximately 6 inches – 1 foot) of line outstanding and casting is a relatively simple matter since the fishing line, including the knot, is readily passed through the eyes of the fishing pole during the forward cast and the float, sinker and hook begin their flight in unison and separate when the float is afloat upon the water. Quite obviously, this method avoids the disadvantages heretofore first described particularly with respect to the drag created by fixed float fishing as well as the accuracy aspects thereof.

Unfortunately, conventional slip-float fishing devices create disadvantages in and of themselves as, for example, the rapidity of wear of the float due to the line passing therethrough during casting and retrieving because of the construction of the float from cork, balsa wood, foam plastic or similar material. A partial solution to this problem has been achieved by associating slit sleeves or tubes with the floats but it has been found that though this reinforces the float and permits quick assembly and disassembly, the slit tube or sleeve creates another disadvantage, namely, the snagging of the fishing line in the slit during retrieving or casting which is particularly undesirable during a retrieving operation with a relatively heavy fish on the line since such a snag renders the reel drag inoperative for its intended purpose, namely, free line movement against a set force directly responsive to fish movement. In addition, such conventional type slit fishing devices do not permit rapid convertibility from one type slip-float to another.

With respect to the latter comment, slip-float fishing has been generally associated with live bait (minnows, worms, crayfish, etc.), but recently so-called "bubble" casting has come into prominence which is simply the use of a slip-float and an artificial lure in the absence of a sinker when, for example, fishing to trout rises at great distances which could not be accomplished by fly fishing equipment due to the distance involved. The aim here is to maintain the lure afloat atop the water or sinking at a moderate rate and thus to convert from the first described slip-float fishing to bubble casting it is necessary to effect rapid removal of the sinker and perhaps the float itself to position a different size or style float (generally more tapered or elongated) to bubble cast. In keeping with this invention the same connector associated with the float may be likewise employed with a sinker whereby the latter can be likewise rapidly removed from the fishing line.

In keeping with the foregoing, it is a primary object of this invention to provide a novel connector for quickly attaching and detaching fishing elements (bobbers, floats, sinkers, etc.) to a fishing line while precluding fouling and/or snagging thereof which includes one or more tubular sleeves slit from end to end along their entire lengths, a plug associated with each sleeve having a longitudinally extending bore defined by an internal unbroken peripheral surface, and means for removably fastening each plug in internal telescopic relationship to its associated sleeve whereby the bores are adapted to guide a fishing line centrally of the sleeves spaced away from the slits thereof to prevent line fouling and/or snagging while at the same time permitting rapid assembly and disassembly when the sleeves are associated with axially bored and slit floats, bobbers, sinkers, or similar fishing elements.

A further object of this invention is to provide a novel connector of the type heretofore set forth wherein the fastening means are interengageable male and female socket means, interengageable threads, or equivalent means for securing the plugs to the sleeves.

A further object of this invention is to provide a novel quick-change slip-float (or sinker) device of the type heretofore described wherein in the case of the fishing element being a float the latter includes a radially opening slot within which is retained magnetic material housed within a sheath of metallic material for receiving a fishing hook barb when the device is not in use.

With the above and other objects in view that will hereinafter appear, the nature of the invention will be more clearly understood by reference to the following detailed description, the appended claimed subject matter, and the several views illustrated in the accompanying drawing.

IN THE DRAWING

FIG. 1 is a side elevational view of the novel quick-change slip-float or sinker device of this invention, and illustrates a pair of sleeves housed in a bore of a float with each sleeve receiving a plug through the bore of which passes a fishing line retained in the position shown by a knot resting atop the uppermost plug.

FIG. 2 is a view similar to FIG. 1, but illustrates the device in its retracted pre-cast position.

FIG. 3 is a perspective view of the components of the quick-change device of FIGS. 1 and 2, and illustrates the components prior to complete assembly and/or disassembly.

FIG. 4 is a slightly enlarged sectional view taken generally along line 4—4 of FIG. 1, and illustrates a slit and bore of the float as well as a sheath for receiving a fishing hook barb.

FIG. 5 is a side elevational view slightly enlarged with a longitudinal section broken away for clarity of the quick-change device, and illustrates the components of FIGS. 1 and 2 in their assembled condition.

FIG. 6 is a fragmentary enlarged view of the encircled portion of FIG. 5, and more clearly illustrates the manner in which one of the plugs is locked to an end of one of the sleeves.

FIG. 7 is an enlarged fragmentary sectional view taken generally along line 7—7 of FIG. 4, and more clearly illustrates the construction of the sheath for retaining the fishing hook in its nonuse position.

FIG. 8 is a fragmentary sectional view similar to FIG. 7 but illustrates a modification thereof in which a radially outwardly opening slot receives a piece of magnetic material for retaining a fishing hook in its nonuse position.

A novel quick-change slip-float (or sinker) device constructed in accordance with this invention is generally designated by the reference numeral 10 and with particular reference to FIG. 3 includes a bobber or float 11, two identical tubular sleeves 12, 12, and two identical plugs 13, 13.

The float 11 includes a generally cylindrical though tapered body 14 having opposite end portions 15, 16. An axial cylindrical bore 17 extends completely through the body 14 from end to end, as does a longitudinal slit 18 which also opens into the bore 17. The body 14 of the float 11 is constructed from balsa wood, cork, foam plastic, or similar buoyant material and, if desired, may be painted different colors at opposite sides of a centrally located peripheral line of demarcation 20. Conventionally the body 14 may be painted red or white above this line and vice versa below.

Each sleeve 12 likewise is of a generally tubular configuration and includes a body 21 having opposite end portions 22, 23 each of which includes one or more recessed means or openings 24. In addition, the body 21 of each sleeve 12 is slit, as at 25, longitudinally from end to end. Moreover, the external diameter of the body 21 of each sleeve 12 is preferably slightly greater than the diameter of the bore 17 of the float 11 so that each sleeve 12 will be friction fit within the bore 17 at the opposite end portions 15, 16, as is best illustrated in FIG. 5. Moreover, the sleeves 12 are preferably constructed from resilient metallic or plastic material such that a single size sleeve by being compressed or expanded can be frictionally held within bores 17 of varying sizes.

Each plug 13 includes a body (unnumbered) having an outer peripheral flange 26, a generally frustoconical medial portion 27 narrowing away from the flange 26, and a bulbous or hemispherical portion 28, as is best illustrated by the upper plug 13 of FIG. 6. In addition, each plug 13 includes an axial bore 30 of a diameter sufficiently large to freely slidingly receive fishing line L ranging in size from, for example, 2–30 lbs. test.

The device 10 is assembled upon the fishing line L in the following manner, it being assumed that the lower end (unnumbered) of the line L is free and does not have attached thereto the split shot or sinker S, the swivel clasp C or the hook H.

The line L, also absent therein a knot K, is threaded through the bores 30 of the plugs 13, 13 with the flange 26 of the plug 13 nearest the fishing pole (not shown) being more closely adjacent thereto than the hemispherical portion 28 while the plug 13 most closely adjacent the free end of the line L is positioned with its flange 26 more adjacent thereto than its hemispherical portion 24. In other words, the plugs 13, 13 are slid upon the line L with the hemispherical portions 24, 24 directed toward each other and the flanges 26, 26 thereof being in remote relationship. At this time the end of the line L can be secured to the swivel clasp C, the hook H can be joined thereto as can the split shot or sinker S. The latter three elements need not at this time be joined to the fishing line L but in essence they may be joined thereto at any time after the line L has been threaded through the plugs 13, 13 in the manner heretofore described.

The line L is now passed through the slit 18 of the body 14 into the bore 17 and through the slits 25 of the sleeves 12, 12 after which the latter are axially inserted into the opposite end portions 15, 16 with the slits 25 being out of alignment with the slit 18. As an alternative, the sleeves 12, 12 may be first inserted into the bore 17 at opposite ends 15, 16 of the body 14 with the slits 25, 25 in alignment with the slit 18 after which the line is inserted into the sleeves 12 through the slits 18, 25, 25, and after which the sleeves 12, 12 are rotated to bring the slits 25, 25 thereof out of alignment with the slit 18.

Thereafter the plugs 13, 13 are inserted into the ends 22, 22 of the sleeves 12 with the hemispherical portions 28 locking into the opening 24 at the end of each sleeve 12, 12 most adjacent the ends 15, 16 of the body 14. As is most readily apparent from FIGS. 5 and 6, the bores 30, 30 of the plugs 13, 13 keep the fishing line L centrally or axially located within the sleeves 12, 12 and the body 14 thus virtually precluding snagging or fouling as the line L moves through the bores 30, 30 during retrieve or casting operations.

Once a desired depth is determined as, for example, 10 feet, the knot K is tied 10 feet from the hook H when, of course, the quick-change device 10 is at a position therebeneath. As the line L is reeled in incident to a casting operation, the float 11 will freely slide therealong until it rests upon the sinker S, in the manner shown in FIG. 2, and at this point the total length of line beyond the fishing rod tip may be, for example, 6–12 inches with the knot K being, of course, wound at some portion upon the reel. When back casting no interference is created due to this short length (6–12 inches) while upon the forward cast the device 10, the sinker S, the swivel clasp C, the hook H and the bait thereupon move as a unit until they strike the water at which point the device 10 will float due to the buoyancy of the material of the body 14 whereas the weight of the sinker S, the swivel clasp C, the hook H and the bait will draw the line L downwardly to the desired fishing depth upon the bottoming of the knot K upon the flange 26 of the upper plug 13 in the manner illustrated in FIGS. 1 and 6 of the drawing. When a fish is caught or when otherwise retrieving the line L, the same will freely pass through the device 10 without snagging.

From the foregoing it will be noted that the relatively soft material from which the body 14 of the float 11 is constructed is protected by the more rigid though resilient material of the sleeves 12, 12. Moreover, the antisnagging feature results both because the slits 18, 25, 25 are out of alignment in the in-use position of the device 20, but more so because the plugs or eyelets 13, 13 maintain the line in the center of the bore 17 and the center of the sleeves 12, 12.

Assume it is now desired to change the float 11, the sleeves 12, 12 are removed or rotated to align their slits 25, 25 with the slit 18 after which the elements 11, 12, 12 can be removed as a unit or individually after the plugs 13, 13 have been removed from the ends 22 of the sleeves 12, 12. Another different size or shape float 11 with or without different size sleeves 12, 12 may be re-applied to the line L, it being noted that the only condition for changing sizes which vary appreciably in diameter is that the ends 22 of the sleeves 12, 12 can be locked to the hemispherical portions 28 of the plugs 13. Once this change is made the sinker S can be removed and an artifical lure may replace the hook H.

Finally, if it is desired to plug or spin cast, the elements 11, 12, 12 can be removed, the knot K untied, and the plugs 13, 13 left upon the line L resulting in the plugs 13, 13 sliding to a position adjacent the swivel clasp C assuming, of course, that the split shot or sinker S had earlier been removed. With the plug now on the fishing line L one can plug cast with little difficulty since the weight of the two remaining plugs 13, 13 have little effect on the flotation of surface lures and virtually no effect on medium or deep diving plugs, spinners or spoons.

During such times as the device 10 is not in use it is desirable to shield the barb B of the hook H and to this end the body 14 of the float 11 is provided with a generally triangular shaped radially outwardly and upwardly opening slot 35 (FIGS. 4 and 7) which receives a generally triangular hollow metallic sheath 36 in which is housed a rubber-like compound having magnetic material embedded therein, this composition being generally designated by the reference numeral 37. As is best illustrated in FIG. 7, the barb B of the hook H may be positioned within the sheath 36 and retained therein by the magnetic attraction of the embedded particles of the composition 37 acting upon the magnetically attractable metallic material of the hook H.

As an alternative arrangement, the slot 35 (FIG. 8) may merely have received therein a generally triangular sheath 38 of magnetic material with the hook being retained in position thereby in the manner obviously apparent from FIG. 8.

While the quick-change device 10 has been described with respect to the use of two sleeves 12, 12 with but a single float 11, it is to be noted that each sleeve 12, 12 has openings 24, 24 at the opposite ends 22, 23 thereof. The purpose of this construction is to permit but a single sleeve 12 to be associated with a float similar to the float 11 but appreciably axially shorter and more particularly a float of a length generally equal to the length of one sleeve 12. Thus, one sleeve could be associated with such a shorter float with the plugs 13, 13 being seated in the openings 24, 24 at opposite ends 22, 23 of but the single sleeve 12. This arrangement is particularly useful in attaching not only shorter floats of buoyant material but sinkers of lead or the like which would correspond to the sinker S of FIG. 1 except that the slit thereof (unnumbered) would terminate in an axial bore whose circumference corresponded to that of the sleeve 12. This would permit sinkers of different sizes, weights, etc., to be rapidly attached to and removed from the line L. Thus, though the invention has been described with specific reference to the fishing element 11 of the device 10 as being a buoyant float or bobber, smaller structures constructed of nonbuoyant material used as weights or sinkers may be equally rapidly attached and/or detached relative to the fishing line L.

While a preferred embodiment of the invention has been thus far described, it is to be noted that modifications may be made in certain aspects thereof without departing from the spirit and scope of the present disclosure. For example, while the plugs 13, 13 are secured to the sleeves 12, 12 by fastening means in the form of the hemispherical portions 28, 28 and the openings 24 of the sleeves 12, 12, the plug may be simply a cylindrical member having threads which engage internal threads of the sleeves. In other words, in lieu of the openings 24, 24 at each of the ends 22, 23, the latter ends may be internally threaded to receive externally threaded portions of the plugs 13. Likewise, the plugs 13 can as well be in the shape of caps having an end panel axially apertured and a peripheral skirt which is internally threaded for threaded securement to external threads of the sleeve ends 22, 23, once again in lieu of the openings 24 thereof. Likewise, the invention contemplates varying the design of such caps, plugs, eyelets of the like as to size or shape in proportion to the size fishing line, float, sinker and/or other fishing equipment used.

In further contemplation of this invention, the line L need not be actually knotted to form the knot K, but instead in lieu of the knot K a piece of sewing or like thin thread can be wrapped around the line L and tied to itself. This additional sewing thread will function in the same manner as the knot K yet need not be removed when plug or spin casting because of the absence of interference with the fishing rod guides or eyes. Moreover, the "knot" so formed by a separate piece of sewing thread can be slid up and down the line L as a depth gauge when float fishing.

I claim:

1. A connector for quickly attaching and detaching fishing elements relative to a fishing line while precluding fouling and/or snagging of the fishing line when in use comprising a generally tubular sleeve slit from end to end along its entire length, a plug having a longitudinally extending bore defined by an internal unbroken peripheral surface, means for removably fastening said plug to said sleeve whereby said bore is adapted to guide a fishing line centrally of said sleeve spaced away from the slit thereof to prevent fishing line fouling and/or snagging, said fastening means are defined by an exteriorly rounded exterior peripheral surface portion of said plug received in recess means in said sleeve.

2. The connector as defined in claim 1 wherein said fastening means are interengageable male and female socket means.

3. The connector as defined in claim 1 including as one of such fishing elements a body slit from end to end along its entire length with said last-mentioned slit opening into a longitudinal bore of a size to snugly receive said sleeve.

4. The connector as defined in claim 1 including as one of such fishing elements a body slit from end to end along its entire length with said last-mentioned slit opening into a longitudinal bore of a size to snugly receive said sleeve.

5. The connector as defined in claim 1 wherein said body is a fishing float.

6. The connector as defined in claim 1 wherein said body is a fishing sinker.

7. A connector for quickly attaching and detaching fishing elements relative to a fishing line while precluding fouling and/or snagging of the fishing line when in use comprising a pair of generally tubular sleeves each slit from end to end along their entire length, said pair of sleeves each being adapted for insertion into opposite ends of a longitudinal bore of a fishing element in spaced relationship to each other, a pair of plugs each having a longitudinally extending bore defined by an internal unbroken peripheral surface, and means for removably fastening each plug to one of said sleeves whereby said bores are adapted to guide a fishing line centrally of said sleeves spaced away from the slits thereof to prevent fishing line fouling and/or snagging.

8. The connector as defined in claim 7 wherein one of said fishing elements is a body of floatable material slit from end to end along its entire length with said last-mentioned slit opening into a longitudinal bore of a size to snugly frictionally retain said sleeves therein.

9. A connector for quickly attaching and detaching fishing elements relative to a fishing line while precluding fouling and/or snagging of the fishing line when in use comprising a generally tubular sleeve slit from end to end along its entire length, a plug having a longitudinally extending bore defined by an internal unbroken peripheral surface, means for removably fastening said plug to said sleeve whereby said bore is adapted to guide a fishing line centrally of said sleeve spaced away from the slit thereof to prevent fishing line fouling and/or snagging, one of said fishing elements being a body slit from end to end along its entire length with said last-mentioned slit opening into a longitudinal bore of a size to snugly frictionally retain said sleeve therein, said fishing body element being constructed from floatable material, and a triangular slit running longitudinally in said fishing body element for retaining in sheath-like fashion a fishing hook.

10. The connector as defined in claim 9 including magnetic material disposed in said slit.

* * * * *